(12) United States Patent
Harding

(10) Patent No.: US 9,382,811 B2
(45) Date of Patent: Jul. 5, 2016

(54) AEROFOIL COOLING ARRANGEMENT

(71) Applicant: ROLLS-ROYCE PLC, London (GB)

(72) Inventor: Adrian Lewis Harding, Derby (GB)

(73) Assignee: ROLLS-ROYCE plc, London (GB)

( * ) Notice: Subject to any disclaimer, the term of this patent is extended or adjusted under 35 U.S.C. 154(b) by 898 days.

(21) Appl. No.: 13/682,028

(22) Filed: Nov. 20, 2012

(65) Prior Publication Data

US 2013/0136599 A1     May 30, 2013

(30) Foreign Application Priority Data

Nov. 24, 2011   (GB) .................................. 1120273.6

(51) Int. Cl.
   *F01D 25/12*      (2006.01)
   *F01D 5/18*       (2006.01)

(52) U.S. Cl.
   CPC ................ *F01D 25/12* (2013.01); *F01D 5/187* (2013.01)

(58) Field of Classification Search
   CPC .......... F01D 25/08; F01D 25/12; F01D 5/18; F01D 5/182; F01D 5/183; F01D 5/184; F01D 5/186; F01D 5/187; F01D 5/188; F01D 5/189; F01D 9/06; F01D 9/065; F05D 2240/81; F05D 2260/201; F05D 2260/203; F05D 2260/204; F05D 2260/221; F05D 2260/2214; F05D 2260/22141

USPC ......................................... 415/115; 416/97 R
See application file for complete search history.

(56) References Cited

U.S. PATENT DOCUMENTS

| | | | |
|---|---|---|---|
| 5,271,715 A | 12/1993 | Zelesky et al. | |
| 5,405,242 A * | 4/1995 | Auxier .................... | B23P 15/04 415/115 |
| 5,419,039 A | 5/1995 | Auxier et al. | |
| 5,624,231 A | 4/1997 | Ohtomo et al. | |
| 7,600,973 B2 | 10/2009 | Tibbott et al. | |
| 2010/0284807 A1 * | 11/2010 | Tibbott ................... | F01D 5/187 416/95 |

FOREIGN PATENT DOCUMENTS

WO    WO 2009/087346 A1    7/2009

OTHER PUBLICATIONS

Mar. 1, 2012 Search Report issued in British Application No. GB1120273.6.

* cited by examiner

*Primary Examiner* — Dwayne J White
*Assistant Examiner* — Alexander White
(74) *Attorney, Agent, or Firm* — Oliff PLC

(57) ABSTRACT

An aerofoil typically for a blade or vane for a gas turbine engine comprises a pressure wall and a suction wall, at least one of the pressure and suction walls comprise corrugations and a coolant hole on an inner surface, the corrugations define a downstream surface and the coolant hole having an inlet defined in the downstream surface.

16 Claims, 3 Drawing Sheets

AEROFOIL COOLING ARRANGEMENT

FIELD OF THE INVENTION

The present invention relates to a cooling arrangement of an aerofoil, such as in a blade or a vane, typically for a turbine stage of a gas turbine engine.

BACKGROUND OF THE INVENTION

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling. In modern gas turbine engines, gas temperatures in a high-pressure turbine are hotter than the melting point of the material of the blades and vanes, necessitating internal air cooling of these aerofoil components.

Conventional high-pressure nozzle guide vane (NGV) castings have a mixture of internal impingement cooling, convection cooling and external film cooling. Impingement cooling systems utilise impingement plates adjacent an external wall and have an array of small holes through which coolant flows to strike the inner surface of the external wall. Impingement plates may be either separate plate inserted to the aerofoil or integrally cast.

U.S. Pat. No. 7,600,973B discloses a conventional 'multipass' cooling system where coolant passes both radially inwardly and outwardly through main cooling passages. This design uses film cooling, internal turbulators and impingement cooling to cool its suction side aerofoil wall. However, coolant films over the suction side wall's external surface are penalizing on performance but they are necessary to make up for relatively inefficient internal cooling.

There is an ever increasing desire to improve cooling of components in gas turbine engines and especially high-pressure turbine vanes and blades. Improved cooling has many benefits including allowing increased gas temperatures and increased overall engine efficiency, increased life of components and/or decreased amount of cooling air that could otherwise be used for increased propulsive efficiency.

It is therefore one of the objects of the present cooling arrangement to improve cooling effectiveness.

BRIEF SUMMARY OF THE INVENTION

Thus a first aspect of the present invention provides an aerofoil for a gas turbine engine, the aerofoil comprises a pressure wall and a suction wall, at least one of the pressure and suction walls comprise corrugations and a coolant hole on an inner surface, the corrugations define a downstream surface and the coolant hole having an inlet defined in the downstream surface.

The corrugations may define an upstream surface.

The wall may define a passage therein and the coolant hole connects between the inlet and the passage.

A coolant may flow through the aerofoil and the downstream surface may be angled between 20° and 90° relative to the direction of coolant flow.

A coolant may flow through the aerofoil and the downstream surface may be angled α is approximately 45° relative to the direction of coolant flow A coolant may flow through the aerofoil and the upstream surface may be angled θ between 20° and 70° relative to the direction of coolant flow.

A coolant may flow through the aerofoil and the upstream surface may be angled θ is approximately 45° relative to the direction of coolant flow The corrugations may define any one or more the sectional profiles generally sinusoidal, rounded triangular, trapezoidal or saw-toothed.

The corrugations define a peak and a cross-section of the passage may have an apex which is adjacent the peak.

The corrugations may define an amplitude or height approximately 0.7 mm.

The corrugations may define an amplitude or height between 0.5 mm and 1.5 mm.

The corrugations may define a peak to peak distance approximately 3 mm.

The corrugations may define a peak to peak distance between peaks between 2.5 mm and 5 mm.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
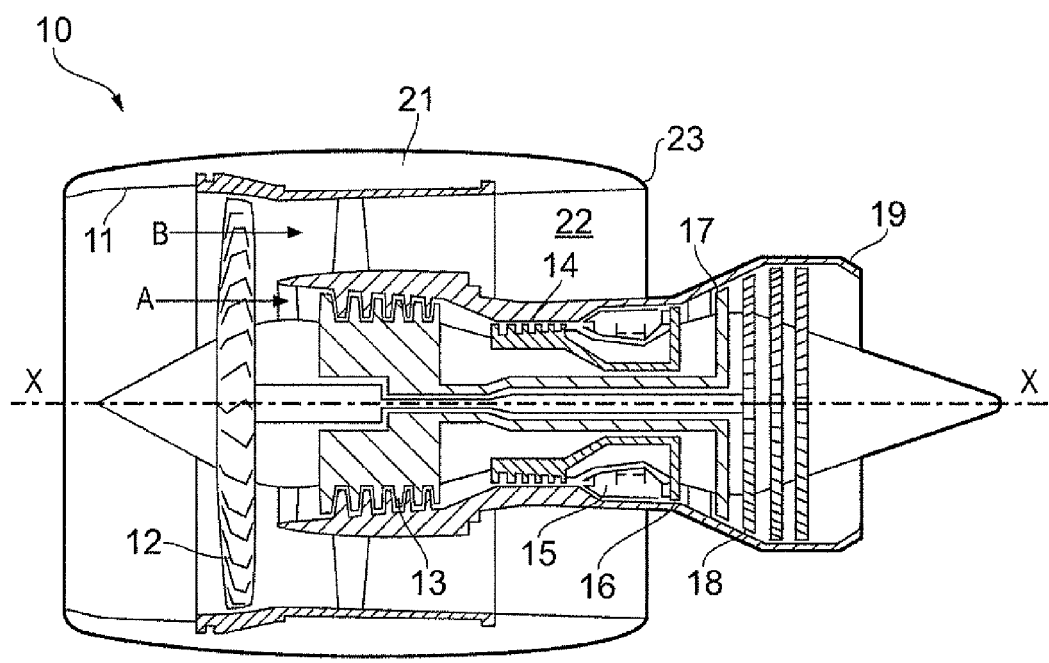
FIG. 1 shows a schematic longitudinal cross-section through a ducted fan gas turbine engine that may incorporate an aerofoil in accordance with the present disclosure.

With reference to FIG. 1, a ducted fan gas turbine engine generally indicated at 10 has a principal and rotational axis X-X. The terms radial, axial and circumferential are used with respect to this axis. The engine comprises, in axial flow series, an air intake 11, a propulsive fan 12, an intermediate pressure compressor 13, a high-pressure compressor 14, combustion equipment 15, a high-pressure turbine 16, an intermediate-pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
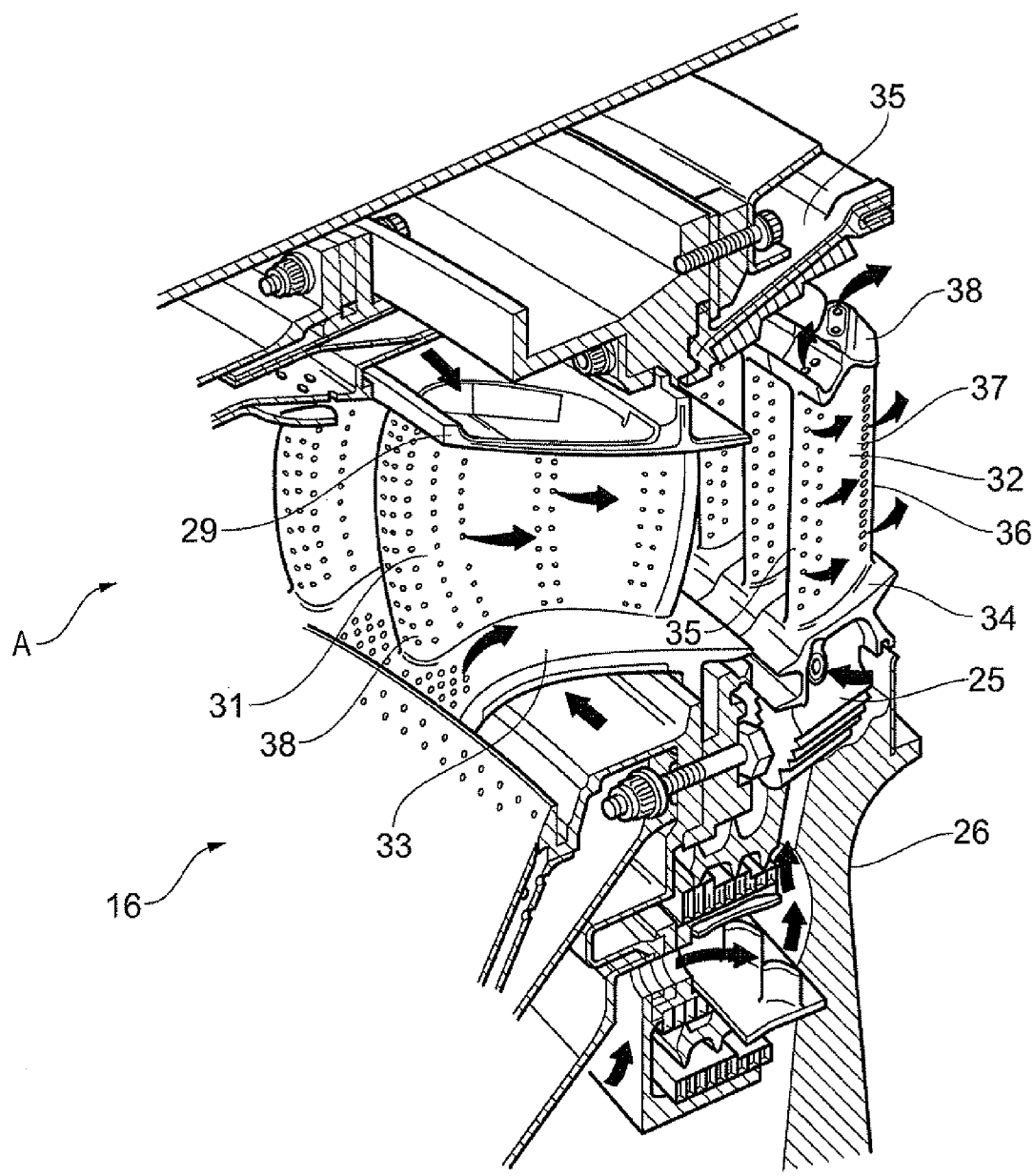
FIG. 2 shows an isometric view of a typical single stage cooled turbine that may incorporate an aerofoil in accordance with the present disclosure.

FIG. 2 shows an isometric view of a typical single stage cooled turbine. In this example the high-pressure turbine 16 is shown. The high-pressure turbine 16 comprises an annular array of radially extending stator vanes 31 and immediately downstream an annular array of radially extending blades 32 mounted to a rotor disc 26. The combustion gases impinge on the vanes which present the gases at an appropriate angle to efficiently drive the turbine blades.

The annular array of stator vanes 31 is immediately downstream of the combustor 15. The vanes therefore require significant cooling and typical cooling air flows are indicated by arrows. Internal convection and external cooling air films are the prime methods of cooling the gas path components—airfoils 37, platforms 33, shrouds 29 and shroud segments 35 etc. High-pressure turbine nozzle guide vanes 31 (NGVs) consume the greatest amount of cooling air on high temperature engines. High-pressure turbine blades 32 typically use about half of the NGV coolant flow. The intermediate-pressure and low-pressure stages downstream of the HP turbine use progressively less cooling air because the combustion gases become progressively cooler.

The high-pressure turbine airfoils are cooled by using high pressure air from one of the compressors, typically the high-pressure compressor, that has by-passed the combustor and is therefore relatively cool compared to the combustion or working gas temperature. Typical cooling air temperatures from the compressor are between 527° C. (800K) and 727° C. (1000K), while gas temperatures can be in excess of 1827° C. (2100K).

The cooling air from the compressor that is used to cool the hot turbine components is not used fully to extract work from the turbine. Therefore, as extracting coolant flow has an adverse effect on the engine operating efficiency and it is important to use the cooling air as effectively as possible.

The turbine blade 32 has a root 25, a platform 34, an aerofoil 37 and tip 38. The root 25 is in the form a 'fir-tree', as known in the art, and slots into a complimentary mounting on the rotor disc in known fashion. Other mounting configurations may be used. The platform 34 sits radially outwardly of the root 25 and partly defines a gas-wash surface between adjacent blades. The aerofoil 37 extends radially outwardly from the platform to the tip 38 and defines aerodynamic pressure and suction surfaces for the flow of combustion gases thereover. The tip 38 helps to prevent over-tip leakage and can comprise sealing features. The tip may be in the form of a full or partial shroud or be shroud less.

Figure 3:
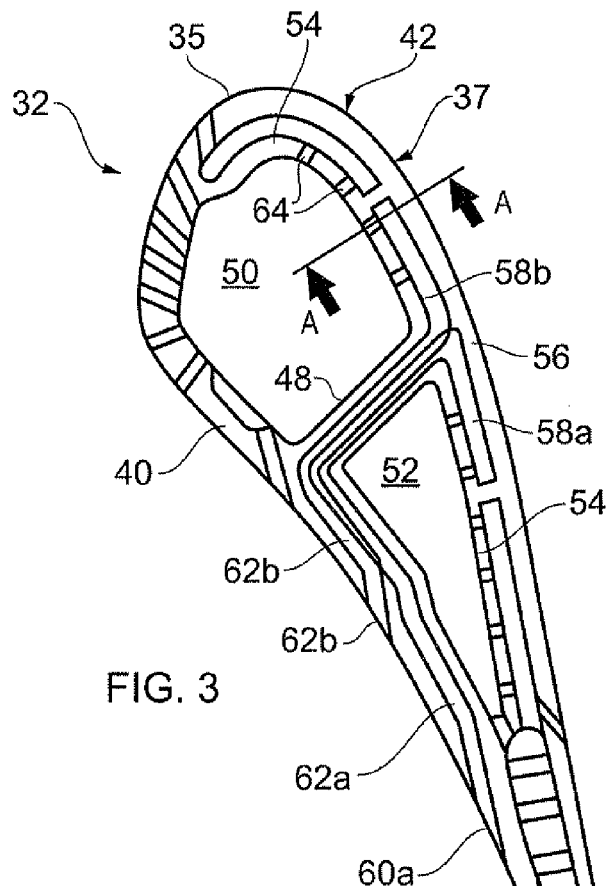
FIG. 3 shows a section through an aerofoil shown in FIG. 2 and is in accordance with the present disclosure.

Referring now to FIG. 3, which is a section through an aerofoil 37 of the turbine blade 32 shown in FIG. 2 and is in accordance with the present disclosure. The general arrangement of the aerofoil is equally applicable to the blade 32 or the vane 31.

The aerofoil 37 of the turbine blade 32 comprises a pressure wall 40 and a suction wall 42 which meet at a leading edge 35 and at a trailing edge 36. The pressure wall 40 and the suction wall 42 define pressure and suction surfaces 44, 46 respectively.

An internal web 48 extends between the pressure wall 40 and a suction wall 42 and which defines at least two main coolant passages 50, 52. In the example shown in FIG. 3 the two main coolant passages 50, 52 are referred to as the leading edge main passage 50 and the trailing edge main passage 52; the respective main passages being adjacent the leading and trailing edges 35, 36 respectively. The web 48 may extend generally radially from the root 25 to the tip 38 defining two independent main passages. Coolant enters the main passage (s) via the root and flows generally radially outwardly towards the tip. Alternatively, the web 48 may extend between the root 25 and tip 38 and define a gap adjacent either or both the root or tip to allow coolant to pass in a multi-pass type arrangement as known in the art. In these arrangements coolant enters one main passage via the root and flows generally radially outwardly towards the tip before turning and flowing radially inwardly towards the root along another main passage; for example coolant may enter the leading edge main passage flow radially outward and then flow radially inwardly along the trailing edge main passage. It should be appreciated that there are many known possible multi-pass and single pass cooling flow systems within blades and vanes and the present disclosure may be applicable to those. For example vanes may be fed coolant via the tip.

The aerofoil 37 has a suction side wall 42 having an inner leaf 54 and an outer leaf 56 that define a cavity 58a. Alternatively or as well as, the pressure wall may be constructed similarly. The inner leaf 54 is an impingement plate and comprises an array of impingement holes 64 through which coolant can pass from the main coolant passage 52 and impinge on the outer leaf 56. The number and arrangement, including position and size of the impingement holes 64 are such that jets of coolant are directed at an inner surface of the outer leaf 56. However, it is not necessary for the inner leaf 54 to be an impingement plate and a solid plate may be used with an inlet and an outlet adjacent the root 25 and tip 38 or vice versa. The inner plate 54 might also be highly perforated and effective to separate a dedicated coolant flow in the cavity 58 from the main flow through the main passage 50 or 52.

The pressure wall 40 defines an outlet 60a in its external gas-wash surface 44 and the aerofoil 37 defines a passage 62a extending from the cavity 58 through the web 48 and to the outlet 60a. Thus part of the coolant entering one or both the main passage 50 or 52 passes through the impingement holes 64 and into the cavity 58 where at least a portion of the coolant in the cavity the passes along the passage 62a through the outlet 60a to be discharged across the external surface 44 to provide a protective coolant film.

The inner leaf 54 and the outer leaf 56 can define a second cavity 58b and the pressure wall 40 (or suction wall 42) defines a second outlet 60b; the aerofoil defines a second passage 62b extending from the second cavity through the web 48 and to the second outlet 60b. It should be appreciated that further sets of cavities, passages and outlets may be implemented with or without additional webs. For example, the cavities 58a, 58b may extend the whole radial length between root 25 and tip 38 or only partially and there may be separate cavities positioned radially inwardly or outwardly of each other. These additional cavities may have dedicated passages and outlets. Furthermore, there may be more than one web 48 provided spanning between the pressure and suction walls. These arrangements may be useful where cooling requirements differ in areas of the aerofoil 37.

The embodiment used to describe the present aerofoil shows the suction wall 42 comprising the inner leaf and the outer leaf 56, which is the preferred embodiment. However, depending on operational conditions, aerofoil configurations and potential implementation in compressor blades and vanes it is possible that the pressure wall 40 may comprise the inner and outer leaves, while the suction surfaces defines the outlets.

Figure 4:
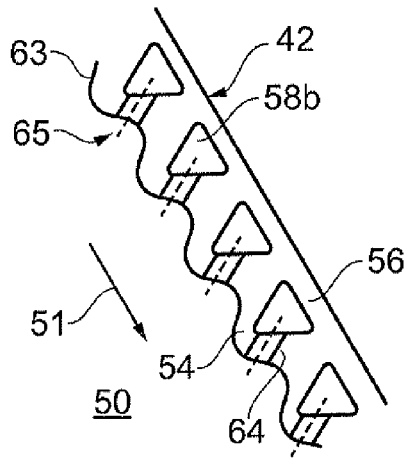
FIG. 4 is an enlarged view on section A-A shown in FIG. 3.
Figure 5:
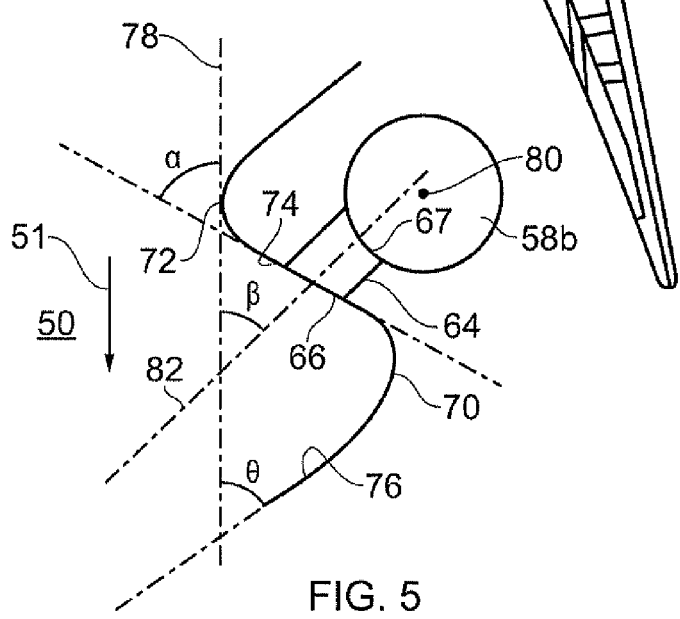
FIG. 5 is a further enlarged view on part of FIG. 4.

Referring now to FIG. 4, which is an enlarged view on section A-A shown in FIG. 3 and illustrates the suction side wall 42, and FIG. 5, which is a further enlarged view on part of FIG. 4. The wall comprises the cooling passages 58b that run in a generally chordal direction relative to the aerofoil. A surface 63 of the wall 42, in this case the internal surface, is comprises corrugations 65. The corrugations 65 are shown as smooth undulations in a generally sinusoidal profile section. The corrugations are generally arranged transverse a flow of gas 51 through the main coolant passage 50 of the aerofoil. The corrugations 65 comprise a peak 72, a trough 70, a downstream (facing) surface 74 and an upstream (facing) surface 76 with respect to coolant flow 51.

On the downstream surface 74 there is defined an inlet 66 to the impingement hole 64 which passes a portion of the main gas flow 51 into the cavity 58b. Thus the coolant flowing in a main passage is routed through the cavity 58b in the suction wall 42, through the web 48 which divides the leading edge main passage 50 from the trailing edge main passage 52 and into the pressure wall 40 before ejecting via film/effusion cooling holes or outlets 60a, 60b.

The passages and cavities are arranged so as to reduce the overall temperature of the aerofoil and reduce the temperature gradients within the aerofoil walls and web via convective and impingement cooling, so reducing stresses and improving component life.

In some circumstances, debris, particles and other foreign objects may be carried in the coolant flow 51 and which can block small cooling holes such as the impingement holes 64. Here the arrangement of corrugations and inlet positions prevents debris, particles and other foreign objects from blocking the holes 64. The upstream facing surface 76 deflects particles away from the wall surface 63 and therefore away from the holes 64. By placing the inlet 66 on the downstream facing surface 74 particles do not have a direct line-of-sight to the inlet 66. Furthermore, vortices or turbulence can form in between peaks 72 and this causes an increase in static pressure adjacent the inlet 66 thereby helping promote entry of coolant into the inlet 66 and through passage 58b.

In the exemplary embodiment shown in FIG. 5 the corrugations 65 are shown as generally sinusoidal, rounded triangular, trapezoidal or saw-toothed. The downstream surface 74 has an angle α to a line 78 which is in the general direction of coolant flow 51 or in the aerofoil of FIG. 3 is generally radial to the engine centre line. The angle α shown is approximately 45°; however, angles between 20° and 90° are particularly useful. The downstream surface 76 has an angle θ to the line 78. The angle θ is approximately 45°; however, angles between 20° and 70° are particularly useful. The angles α and θ need not be the same and therefore the corrugations 65 do not need to be symmetrical.

Embodied in the exemplary embodiment shown in FIGS. 3-5, the amplitude or height of the corrugations (peak to trough) are approximately 0.7 mm and the peak to peak distance is approximately 3 mm. It is envisaged for gas turbine applications, the height of the corrugations may be between 0.5 mm and 1.5 mm and the distance between peaks between 2.5 mm and 5 mm.

The centre-line 82 of the impingement hole 64 is shown at an angle β relative to the line 78. The angle β is such that the hole connects between the inlet and the position of the passage 58b. Typically, the angle β is between 30° and 90° and preferably about 45°. The centre-line 82 is shown off-set from a centre-line 80 of the passage 58b. This is advantageous in order to accommodate the passage 58b in the thickness of the wall 42. It may be preferably, where possible for the centre-line 82 to be coincident with the centre-line 80 of the passage 58b so that the impingement coolant strikes the passage walls at an as oblique angle as possible to maximise impingement cooling.

The inlet 66 of the hole 64 is shown located approximately at a midpoint between peak 72 and trough 70; however, the hole may be located anywhere on the downstream surface 74 between the peak 72 and the trough 70.

As shown in FIG. 4 the passages 58b are generally triangular or rounded triangular. Advantageously one apex 73 is arranged adjacent a peak 72 which helps to maintain a wall thickness. Additionally, where the passages 58b cross the web 48 along with adjacent passages 58a, the passages 58b and 58a may be more compactly spaced. However, as shown in FIG. 5 the passage 58b may be circular or any other manufacturable shape.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An aerofoil for a gas turbine engine, the aerofoil comprising:
   a pressure wall and a suction wall; and
   a main cooling passage between the pressure wall and the suction wall, the main cooling passage including a main cooling passage inlet from which cooling air is received and flows, wherein
   an inner surface of at least one of the pressure wall and the suction wall comprises corrugations and a coolant hole inlet, and
   the corrugations define a downstream surface with respect to the main passage inlet and a coolant flow received therefrom, the coolant hole inlet being defined in the downstream surface.

2. The aerofoil of claim 1, wherein the corrugations define an upstream surface.

3. The aerofoil of claim 2, wherein the coolant flows through the aerofoil and the upstream surface is angled θ between 20° and 70° relative to a direction of coolant flow.

4. The aerofoil of claim 2, wherein the coolant flows through the aerofoil and the upstream surface is angled θ at 45° relative to a direction of coolant flow.

5. The aerofoil of claim 1, wherein the at least one of the pressure wall and the suction wall defines a passage therein and the coolant hole connects between the inlet and the passage.

6. The aerofoil of claim 5, wherein the corrugations define a peak, and a cross-section of the passage has an apex which is adjacent the peak.

7. The aerofoil of claim 1, wherein the coolant flows through the aerofoil and the downstream surface is angled between 20° and 90° relative to a direction of coolant flow.

8. The aerofoil of claim 1, wherein the coolant flows through the aerofoil and the downstream surface is angled α at 45° relative to a direction of coolant flow.

9. The aerofoil of claim 1, wherein the corrugations define any one or more of the sectional profiles generally sinusoidal, rounded triangular, trapezoidal or saw-toothed.

10. The aerofoil of claim 1, wherein the corrugations define an amplitude or height of the corrugations of 0.7 mm.

11. The aerofoil of claim 1, wherein the corrugations define an amplitude or height of the corrugations between 0.5 mm and 1.5 mm.

12. The aerofoil of claim 1, wherein the corrugations define a peak to peak distance of 3 mm.

13. The aerofoil of claim 1, wherein the corrugations define a peak to peak distance between peaks between 2.5 mm and 5 mm.

14. The aerofoil of claim 1, wherein the corrugations are generally arranged transverse to the gas flow path through the main coolant passage of the aerofoil.

15. The aerofoil of claim 1, wherein the main cooling passages extend in a radial direction from a root end of the aerofoil towards a tip of the aerofoil.

16. The aerofoil of claim 15, wherein the wall comprises cooling passages that run in a generally chordal direction relative to the aerofoil.

* * * * *